(12) United States Patent
Kristoffersen et al.

(10) Patent No.: US 9,161,237 B2
(45) Date of Patent: Oct. 13, 2015

(54) CHECKING A VALIDITY OF COVERAGE AREA POSITION INFORMATION

(75) Inventors: Jens Finn Kristoffersen, Roskilde (DK); Henning Steensgaard Jensen, Solrod Strand (DK)

(73) Assignee: Nokia Technologies Oy, Espoo (FI)

( * ) Notice: Subject to any disclaimer, the term of this patent is extended or adjusted under 35 U.S.C. 154(b) by 302 days.

(21) Appl. No.: 13/703,851

(22) PCT Filed: Jun. 16, 2010

(86) PCT No.: PCT/IB2010/052703
§ 371 (c)(1),
(2), (4) Date: Mar. 4, 2013

(87) PCT Pub. No.: WO2011/158063
PCT Pub. Date: Dec. 22, 2011

(65) Prior Publication Data
US 2013/0196682 A1    Aug. 1, 2013

(51) Int. Cl.
*H04W 24/00*   (2009.01)
*H04W 64/00*   (2009.01)
*G01S 5/02*    (2010.01)
*H04W 4/02*    (2009.01)

(52) U.S. Cl.
CPC .............. *H04W 24/00* (2013.01); *G01S 5/0236* (2013.01); *H04W 4/02* (2013.01); *H04W 4/025* (2013.01); *H04W 64/00* (2013.01)

(58) Field of Classification Search
CPC ..... H04W 64/00; H04W 88/085; H04W 4/02; H04W 4/025
USPC ........................................ 455/456, 445, 12.1
See application file for complete search history.

(56) References Cited

U.S. PATENT DOCUMENTS

2003/0125046 A1   7/2003   Riley et al.
2005/0037775 A1   2/2005   Moeglein et al.

FOREIGN PATENT DOCUMENTS

WO    WO02082832    10/2002

OTHER PUBLICATIONS

International Search Report for International Application No. PCT/IB2010/052703—Date of Completion of Search: Mar. 11, 2011—5 pages.

*Primary Examiner* — Nizar Sivji
(74) *Attorney, Agent, or Firm* — Locke Lord LLP

(57) ABSTRACT

It is inter alia disclosed to identify coverage area position information to obtain identified coverage area position information. The identified coverage area position information comprises at least respective position information for one or more coverage areas associated with a device for which a position estimate is to be determined at least based on at least a part of the identified coverage area position information. The respective position information for the one or more coverage areas is stored in a database. The identifying is at least based on coverage area identification information determined by the device and comprising at least respective identification information for the one or more coverage areas. A validity of respective position information for at least one coverage area is checked. The respective position information for the at least one coverage area is stored in the database, and the checking is at least based on respective position information for at least one of the one or more coverage areas comprised in the identified coverage area position information.

18 Claims, 8 Drawing Sheets

CHECKING A VALIDITY OF COVERAGE AREA POSITION INFORMATION

FIELD

Embodiments of this invention relate to the field of positioning, in particular to positioning that is based on coverage area position information.

BACKGROUND

As an alternative or add-on to satellite-based positioning systems, positioning systems in which a present position of a terminal is estimated based on an identification of one or more coverage areas a terminal is currently associated with and a database that stores Position Information (PI) for a plurality of coverage areas have gained recent interest. A terminal may for instance be associated with a coverage area if it is able to "hear" signals sent by an entity (such as for instance abase station of a cellular communication system or a Wireless Local Area Network (WLAN) Access Point (AP)) that provides said coverage area. The PI for the one or more coverage areas associated with the terminal may then be retrieved from the database and combined to determine a position estimate for the terminal.

SUMMARY OF SOME EMBODIMENTS OF THE INVENTION

PI for coverage areas can for instance be collected from the field by terminals that are equipped with Global Navigation Satellite System (GNSS) receivers or use other technology for accurately determining their current position and that are also capable of determining with which coverage areas they are currently associated. These terminals then may report their current position and an identification of the one or more coverage areas they are currently associated with to a processing unit that analyzes this information and extracts respective PI for coverage areas. With a sufficiently large number of such terminals distributed and/or moving across the area of the communication system with which the coverage areas are associated and providing their data to the processing unit, rather accurate PI for the coverage areas can be gathered and stored in a database, which may for instance be accessed by a terminal to be positioned via a server or may at least partially be stored in a terminal to be positioned for local reference.

This approach of gathering PI for coverage areas can advantageously be performed without requiring cooperation with or information from an operator of the communication system with which the coverage areas are associated.

However, if coverage areas change, for instance because an operator moves one or more coverage areas to another location, splits a coverage area into several coverage areas and/or adjusts a power and/or direction of an entity providing the coverage area, to name but a few examples, it is difficult—if not impossible—to quickly reflect these changes in the database that stores the PI for the coverage areas. In particular, if at least a part of this database is stored in a terminal to enable the terminal to determine its position based on the terminal's capability to identify the coverage area(s) it is currently associated with and on the PI for the coverage area(s) stored in the database, updating this database to reflect changes in coverage areas may not be possible at all.

Now, if a position estimate is to be determined (by the terminal or by another unit) based on PI stored in the database, and if this database is not up to date due to changes in coverage areas, the position estimate will be erroneous in all cases where it is at least based on PI of a coverage area that has changed. Depending on the application on the terminal that requires the position estimate (e.g. a navigation/routing application or a location-based service such as for instance a restaurant finder, to name but a few examples), such an erroneous position estimate can be particularly annoying for a user of the terminal.

One approach to keep a database with PI for coverage areas up to date is to validate PI for coverage areas already stored in the database based on information from terminals that are capable of determining their current position (e.g. by using a GNSS receiver) and of identifying the coverage areas they are currently associated with, and to only keep validated PI in the database. However, even then it may take a considerate time until a database has adapted to changes in one or more coverage areas. Furthermore, if a copy of at least a part of the database has been provided to terminals to enable them to position themselves based on this copy, updating or replacing this copy may not be possible, for instance due to lack of access to these terminals, or may require further time.

In view of the above, an embodiment of the invention as described by the attached independent claims thus comprises:

identifying coverage area PI to obtain identified coverage area PI comprising at least respective PI for one or more coverage areas associated with a device for which a position estimate is to be determined at least based on at least a part of the identified coverage area PI, the respective PI for the one or more coverage areas stored in a database, and the identifying at least based on coverage area identification information determined by the device and comprising at least respective identification information for the one or more coverage areas; and checking a validity of respective PI for at least one coverage area, the respective PI for the at least one coverage area stored in the database, and the checking at least based on respective PI for at least one of the one or more coverage areas comprised in the identified coverage area PI.

Checking validity of PI stored in a database inter alia allows improving the quality of the position estimate that is to be determined for the device, for instance by discarding PI that has been found invalid when determining the position estimate for the device. This checking additionally or alternatively allows removing or blacklisting invalid (for instance outdated) PI in the database. This checking is based on respective PI comprised in the identified coverage area PI (identified based on the coverage area identification information determined by the device), which in turn serves as an at least partial basis for determining a position estimate for the device. The checking thus forms part of the process of determining a position estimate for the device, so that for instance invalid PI can be excluded from the determining of the position estimate, or so that for instance a position estimate determined based on at least one invalid PI can be discarded or marked unreliable. This may significantly contribute to improving the quality of the position estimate for the device. Furthermore, additionally or alternatively, a continuous maintenance of the database can be performed by identifying invalid PI contained therein without necessarily requiring deployment of devices that are equipped with GNSS receivers and report both their current position and the coverage areas they are currently associated with. In some embodiments of the invention, thus continuous maintenance of the database (at least with respect to the identification of invalid PI) becomes possible without requiring devices that are equipped with GNSS receivers.

Further advantageous embodiments of the invention are described by the attached dependent claims and by the detailed description presented below.

Other features of the invention will be apparent from and elucidated with reference to the detailed description presented hereinafter in conjunction with the accompanying drawings. It is to be understood, however, that the drawings are designed solely for purposes of illustration and not as a definition of the limits of the invention, for which reference should be made to the appended claims. It should further be understood that the drawings are not drawn to scale and that they are merely intended to conceptually illustrate the structures and procedures described therein. In particular, presence of features in the drawings should not be considered to render these features mandatory for the invention.

DETAILED DESCRIPTION OF EMBODIMENTS OF THE INVENTION

Figure 1A:
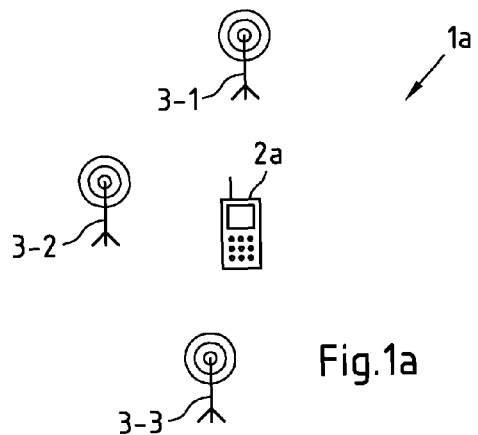
FIG. 1a: An example of a system according to the first embodiment of the invention.

Embodiments of the invention relate to the reliability of position estimation technologies that are based on a so-called radiomap database. This radiomap database links position estimates to radio network data. So-called fingerprint data (for example an identification of a current cell and one or more neighbour cells determined by a device to be positioned) together with the radiomap database (information on the respective positions/areas of the cells) make it possible to provide a position estimate for the device (for instance by triangulation of the positions of the cells identified by the fingerprint data, or by forming an intersection of the areas of the cells identified by the fingerprint data).

Embodiments of the invention concern cases where radiomap data is stored locally on a device and position estimates are also done on the device, or where radiomap data is stored on a centralized server and position calculations are done on the centralized server based on fingerprint data uploaded from the device.

Cellular networks are controlled/maintained by operators, but the radiomap data stored in the devices or on centralized servers and used in the position calculation rely on data/fingerprints earlier collected from the field (for instance by a plurality of device that are capable of both determining their current position (e.g. based on GNSS technology) and determining a current fingerprint, i.e. an identification of the cells it is currently associated with).

This radiomap data may then be maintained by frequently making fingerprint measurements by GNSS-enabled devices to check that the cells are located as expected.

However, when/if an operator moves one or more cells geographically from one location to another, the radiomap database will then contain invalid/mismatch of cell data which will lead to incorrect position calculations, i.e. a user of a device to be positioned will get wrong geo-coordinates. This will be the case until the radiomap data somehow has been corrected with new updated data (from GNSS-enabled devices as explained above), which may take a long time before happening. In some cases when radiomap data is stored locally on the device, the data might never get updated.

To improve this situation, embodiments of the invention make it possible to detect whether data about a radio network (e.g. data stored in the radiomap) is invalid or out-of-date when used in positioning estimation calculations. Embodiments of the invention suggest logic to auto-detect which cells have moved, and also to remove or blacklist such specific cells in the radiomap database to avoid these cells to be used in any position calculations.

Embodiments of the present invention are not limited to cells of cellular communication systems, but apply to coverage areas of coverage providing entities in general.

A method according to a first embodiment of the invention thus comprises:

identifying coverage area PI to obtain identified coverage area PI comprising at least respective PI for one or more coverage areas associated with a device for which a position estimate is to be determined at least based on at least a part of the identified coverage area PI, the respective PI for the one or more coverage areas stored in a database, and the identifying at least based on coverage area identification information determined by the device and comprising at least respective identification information for the one or more coverage areas; and checking a validity of respective PI for at least one coverage area, the respective PI for the at least one coverage area stored in the database, and the checking at least based on respective PI for at least one of the one or more coverage areas comprised in the identified coverage area PI.

This method (and also the methods according to the further embodiments of the invention described below) may for instance be performed by an apparatus.

Further features of the first embodiment of the invention are as follows.

The device for which a position estimate is to be determined is associated with one or more coverage areas. Therein, a coverage area may for instance be understood as a (geographical) area in which one or more coverage providing entities (such as for instance one or more cellular base stations, one or more WLAN APs, or one or more radio/television broadcast stations, to name but a few examples) provide coverage, for instance radio coverage. Coverage may for instance be understood to be provided if a device can "hear"

the coverage providing entity or entities of the coverage area. A device may for instance be considered to "hear" a coverage providing entity if it is able to receive one or more signals (e.g. a broadcast channel), which are sent by the coverage providing entity, with a pre-defined minimum quality (for instance defined in terms of a signal-to-noise ratio or a signal-to-noise and interference ratio), or if the device is capable of at least partially receiving and correctly decoding one or more signals sent by the coverage providing entity (e.g a broadcast channel), or if the device is able to receive and correctly decode a coverage providing entity identifier (for instance a Medium Access Control (MAC) address or another identifier).

A device may for instance be considered to be associated with a coverage area if it is able to "hear" the coverage providing entity or entities of the coverage area. A device may be associated with more than one coverage area at a time, for instance with a coverage area that represents a serving cell of a cellular radio communication system and one or more coverage areas that represent neighboring cells with respect to the serving cell.

For the one or more coverage areas, respective PI exists. The PI may for instance comprise information on a position of a representation of the coverage area, such as for instance the position of a coverage area model. This PI may further comprise information on an extent of the representation of the coverage area. For instance, the representation of the coverage area may be a circular or elliptical representation of the coverage area, and the PI may then comprise at least the centre coordinates (for instance in geodetic coordinates) of the elliptical model. Further information such as the length of the semi-major and semi-minor ellipses and/or the orientation of the ellipse may also be comprised in the PI. As a further example, a coverage area may be represented by its coverage providing entity only, and then the PI may only comprise a position of this coverage providing entity (e.g. a WLAN AP). It is to be noted that a representation of a coverage area may represent the coverage area with hard (physical) boundaries or with soft (statistical) boundaries (for instance by means of a probability (density) function, such as for instance a multi-normal distribution).

PI for a plurality of coverage areas is stored (or contained) in the database, for instance together with identifiers for the coverage areas. The database may for instance be a radiomap database.

The device (for instance a functional unit thereof) determines coverage area identification information that comprises identification information for the one or more coverage areas associated with the device. Identification information for a coverage area may for instance be an identifier of the coverage area. A non-limiting example of such an identifier is an identifier of a coverage providing entity (e.g. an identifier of a base station of a cellular radio communication system or a WLAN AP (e.g. a Medium Access Control (MAC) address)), for instance for cases where each coverage area is provided by a single coverage providing entity. A further non-limiting example of such an identifier is a Location Area Code (LAC) of a cellular radio communication system (e.g. a Global System for Mobile Communication (GSM) system) that then may pertain to several coverage providing entities.

Based on this coverage area identification information, coverage area PI is identified from the database, thus yielding identified coverage area PI. This identifying may for instance comprise identifying the PI for those coverage areas that are respectively identified by the identification information contained in the coverage area identification information.

Based on at least a part of the identified coverage area PI (for instance based on the respective PI for only one or more of the one or more coverage areas identified by the coverage area identification information), a position estimate for the device can be determined. This may for instance be performed by the apparatus that performs the identifying (and the checking), or by another device.

Furthermore, the validity of respective PI (stored in the database) for at least one coverage area is checked. This checking is at least based on respective PI for at least one of the one or more coverage areas comprised in the identified coverage area PI.

A computer program according to the first aspect of the invention comprises program code for performing at least the operations of the method according to the first embodiment of the invention presented above when the computer program is executed on a processor. The computer program may for instance be distributable via a network, such as for instance the Internet. The computer program may for instance at least partially represent software and/or firmware of a processor.

The computer program may for instance be storable and/or encodable in a computer-readable medium. The computer-readable medium may for instance be embodied as an electric, magnetic, electro-magnetic, optic or other storage medium, and may either be a removable medium or a medium that is fixedly installed in an apparatus or device. Non-limiting examples of such a computer-readable medium are a Random-Access Memory (RAM) or a Read-Only Memory (ROM). The computer-readable medium may for instance be a tangible medium, for instance a tangible storage medium (see FIG. 4). A computer-readable medium is understood to be readable by a computer, such as for instance a processor.

An apparatus according to the first embodiment of the invention is configured to realize or comprises means for realizing at least the operations of the method according to the first embodiment of the invention presented above. The means of this apparatus can be implemented in hardware and/or software. They may comprise for instance a processor (see for instance processors 20 and 30 of FIGS. 2 and 3 below) for executing program code for realizing the required functions, a memory (see for instance program memory 22 and 32 of FIGS. 2 and 3 below) storing the program code, or both. Alternatively, they could comprise for instance a circuitry that is designed to realize the required functions, for instance implemented in a chipset or a chip, like an integrated circuit. Further alternatively, the means could be functional modules of a computer program code.

Another apparatus according to the first embodiment of the invention comprises at least one processor (see for instance processors 20 and 30 of FIGS. 2 and 3 below) and at least one memory (see for instance program memory 22 and 32 of FIGS. 2 and 3 below) including computer program code, the at least one memory and the computer program code configured to, with the at least one processor, cause the apparatus at least to perform the operations of the method according to the first embodiment of the invention presented above. The computer program code included in the memory may for instance at least partially represent software and/or firmware for the processor.

These apparatuses according to the first embodiment of the invention may for instance be a part of the device for which a position estimate is to be determined.

Alternatively, the apparatuses may for instance be a part of a server. The server may for instance comprise the database and/or may have access to the database, and/or may be configured to receive the coverage area identification information from the device.

A system according to the first embodiment of the invention may for instance comprise a device and optionally a server, wherein one of the device and the server comprises an apparatus according to the first embodiment of the invention.

Advantages that may arise from this first embodiment of the invention have already been described above in the "SUMMARY" section.

In the following, with respect to FIGS. 1a-1c, 2 and 3, examples of systems and apparatuses according to the first embodiment of the invention are presented. With respect to FIG. 4, an example of a tangible storage medium according to the first aspect of the present invention is described. Then, an example of a method according to the first embodiment of the invention will be discussed with respect to FIG. 5. Further embodiments of the invention will then be discussed with respect to FIGS. 6-10.

FIG. 1a shows an example of a system 1a according to the first embodiment of the invention. The system comprises a device 2a, which may for instance be a terminal that is capable of operating in one or more radio communication systems, and a plurality of coverage providing entities of these one or more communication systems, of which only three coverage providing entities 3-1, 3-2 and 3-3 are shown. Device 2a is considered to be associated with a coverage area if it is able to hear the coverage providing entity of this coverage area. For each coverage area, respective PI exists, for instance information on a (centre) position and/or an extent of a representation of the coverage area. This information, together with respective identification information for a coverage area, is stored (or contained) in a radiomap database for a plurality of coverage areas, for instance all coverage areas pertaining to one or more communication systems, for instance limited to a specific geographic area (for instance the area of a country, or the area covered by a communication system of an operator). In the embodiment of FIG. 1a, it is assumed that this radiomap database, or at least a part thereof, is locally stored in device 2a, so that device 2a can determine its position by determining which coverage areas it is associated with, and by properly combining the PI for these coverage areas stored in the radiomap database (for instance by triangulation, if the PI only contains positions, or by forming an intersection, if the PI contains information on a position and an extent of the coverage areas).

Figure 1B:
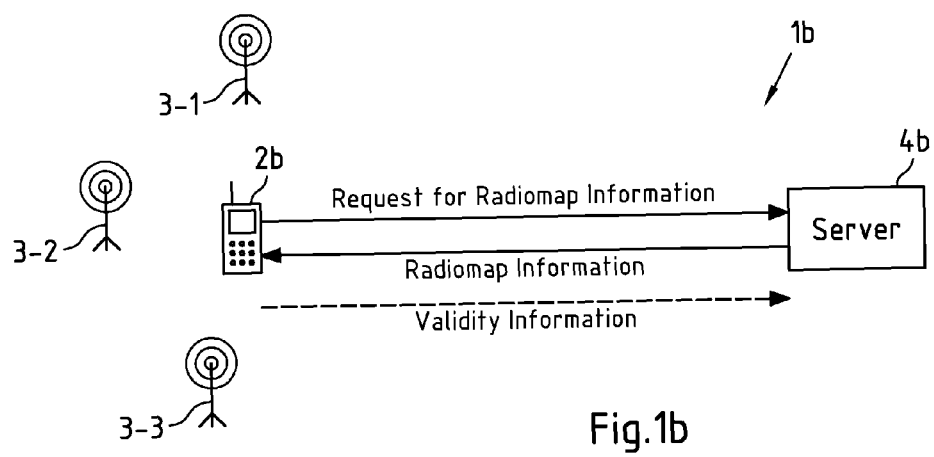
FIG. 1b: a further example of a system according to the first embodiment of the invention.

FIG. 1b shows an example of a system 1b according to the first embodiment of the invention, which basically resembles the system 1a of FIG. 1a. However, in system 1b, device 1b has the possibility to request radiomap information from a server 4b, which then provides the radiomap information for local storage in device 2b. This either allows only storing a part of the radiomap in device 2b, for instance the part that is currently required by device 2b for estimating its position (for instance when operating in a specific communication system and/or when being located in a specific area), or to receive updated versions of the entire radiomap or of parts thereof from time to time. If device 2b only has limited memory, only that amount of radiomap information required to determine a current position estimate for device 2b may be requested.

In the system 1b of FIG. 1b, it is assumed that device 2b determines the position estimate for device 2b, and that device 2b also checks if PI in the radiomap is valid. Information on a detected validity/invalidity of PI may then optionally be provided to server 4, as indicated by the dashed arrow in FIG. 1b. This may allow improving the copy of the radiomap maintained at server 4b, and not only the copy of the radiomap stored in device 2b.

Figure 1C:
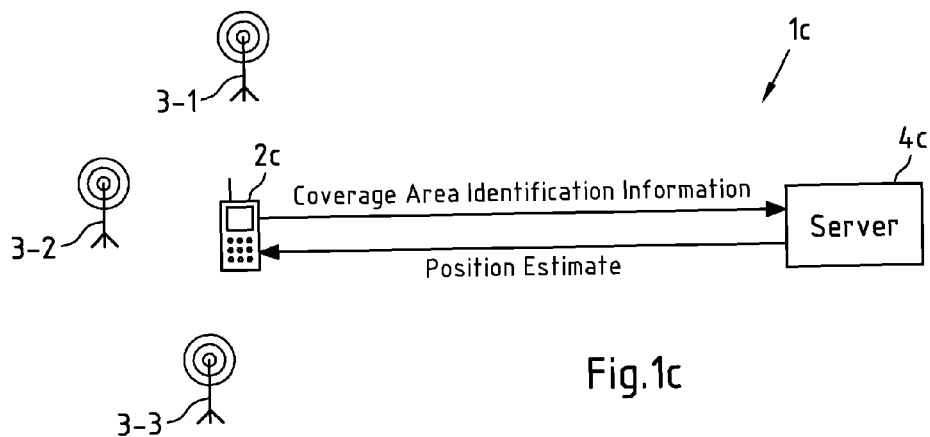
FIG. 1c: a further example of a system according to the first embodiment of the invention.

FIG. 1c shows an example of a system 1c according to the first embodiment of the invention, which basically resembles the systems 1a and 1b of FIGS. 1a and 1b. However, in system 1c, it is assumed that the radiomap database is maintained at server 4c, and that server 4c also determines the position estimate for device 2c, based on coverage area identification information received from device 2c. The position estimate may then be returned to device 2c, for instance if device 2c requested the positioning, or may be provided to another entity (e.g. an operator of the communication system device 2c is currently active in), for instance to support location based services. Server 4c then also checks if the PI contained in the radiomap database is valid or not.

Figure 2:
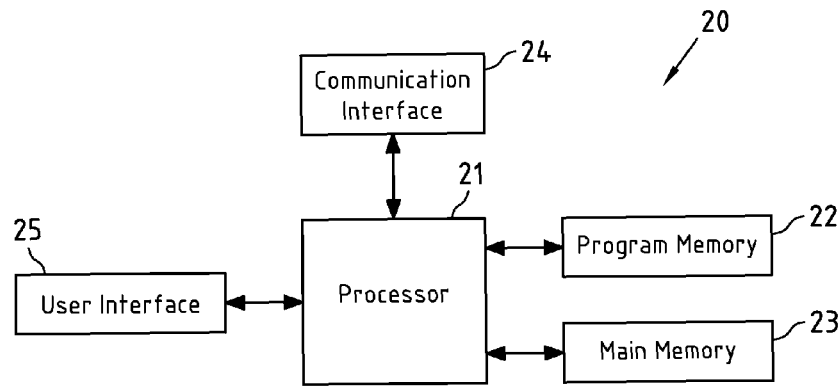
FIG. 2: a schematic block diagram of an example of an apparatus according to the first embodiment of the invention, which is or forms a part of a device.

FIG. 2 is a schematic block diagram of an example of an apparatus 20 according to the first embodiment of the invention. Apparatus 20 is or forms a part of device 2a, 2b or 2c of FIGS. 1a-1c.

Apparatus 20 comprises a processor 21, which may for instance be embodied as a microprocessor, Digital Signal Processor (DSP) or Application Specific Integrated Circuit (ASIC), to name but a few non-limiting examples. Processor 21 executes a program code stored in program memory 22 (for instance program code implementing the flowcharts of FIGS. 5-10, if apparatus 20 is part of device 2a or 2b of FIGS. 1a-1b), and interfaces with a main memory 23, which may for instance store at least a part of a radiomap database (if apparatus 20 is part of device 2a or 2b of FIGS. 1a-1b). Some or all of memories 22 and 23 may also be included into processor 21. Memories 22 and/or 23 may for instance be embodied as Read-Only Memory (ROM), Random Access Memory (RAM), to name but a few non-limiting examples. One of or both of memories 22 and 23 may be fixedly connected to processor 21 or removable from processor 21, for instance in the form of a memory card or stick.

Processor 21 further controls a communication interface 24 configured to receive and/or output information. Communication interface 24 may thus for instance comprise circuitry such as modulators, filters, mixers, switches and/or one or more antennas to allow transmission and/or reception of signals. For instance, communication interface 24 may be configured to exchange information with coverage providing entities 3-1, 3-2 and 3-3 of FIGS. 1a-1c, for instance according to one or more 2G/3G/4G cellular radio communication systems and/or a WLAN system. Communication interface 24 may in particular enable apparatus 20 to determine if it can hear coverage providing entities.

If apparatus 20 is part of device 2b or 2c of FIGS. 1b-1c, communication interface 24 is further configured to allow information exchange between device 2b or 2c and server 4b and 4c of FIGS. 1b-1c as explained with reference to FIGS. 1b-1c above. This transmission may take place via one or more further communication entities, such as for instance a gateway, and may at least partially be wireless and/or wirebound. Therein, a wireless transmission (for instance between device 2b or 2c and a first communication entity in this transmission path) may for instance be according to a communication system according to which one or more of the coverage providing entities 3-1, 3-2 and 3-3 operate, or according to another communication system.

In some embodiments of the invention (see for instance the sixth embodiment described below), communication interface 24 is further configured to receive signals from satellites of a satellite-based positioning system. This functionality may however not be required by the majority of the other embodiments of the invention.

Processor 21 further controls a user interface 25 configured to present information to a user of apparatus 20 and/or to receive information from such a user. Information presented to the user may for instance comprise information on a position estimate determined by positioning based on heard coverage providing entities and the radiomap database. User interface 25 may for instance be the standard user interface via which a user of device 2a, 2b or 2c of FIGS. 1a-1c interacts with device 2a, 2b or 2c to control other functionality of device 2a, 2b or 2c, such as making phone calls, browsing the Internet, etc.

Figure 3:
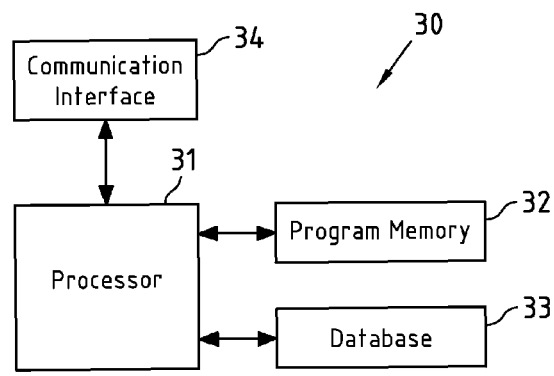
FIG. 3: a schematic block diagram of an example of an apparatus according to the first embodiment of the invention, which is or forms a part of a server.

FIG. 3 is a schematic block diagram of an embodiment of an apparatus 30 according to the invention. Apparatus is or forms a part of server 4b or 4c of FIGS. 1b-1c.

Apparatus 30 comprises a processor 31, which may for instance be embodied as a microprocessor, Digital Signal Processor (DSP) or Application Specific Integrated Circuit (ASIC), to name but a few non-limiting examples. Processor 31 executes a program code stored in program memory 32 (for instance program code implementing the flowcharts of FIGS. 5-10, if apparatus 30 is part of server 4c of FIG. 1c), and interfaces with a database 33, which stores at least a part of a radiomap database (if apparatus 30 is part of server 4b or 4c of FIGS. 1b-1c). Memory 32 may also be included into processor 31. Memory 32 may for instance be embodied as Read-Only Memory (ROM), Random Access Memory (RAM), to name but a few non-limiting examples. Memory 32 may be fixedly connected to processor 31 or removable from processor 31, for instance in the form of a memory card or stick. Memory 33 storing the radiomap database (or at least a part thereof) may for instance be embodied as mass storage device, for instance with capacities of several Gigabyte or several Terabyte. It may either be fixedly connected to processor 31, or may be releasably connectable thereto.

Processor 31 further controls a communication interface 34 configured to receive and/or output information. Communication interface 34 may thus for instance comprise circuitry such as modulators, filters, mixers, switches and/or one or more antennas to allow transmission and/or reception of signals. For instance, if apparatus 30 is part of servers 4b or 4c of FIGS. 1b-1c, communication interface 34 may be configured to exchange information with devices 2b and 2c, respectively, as explained with reference to FIGS. 1b-1c above, i.e. via an at least partially wireless and/or wire-bound transmission path that may comprise one or more communication entities. A wire-bound segment of this transmission path may for instance be based on the Internet Protocol (IP), and communication interface 34 may then be configured to allow IP-based communication.

It is to be noted that the circuitry formed by the components of apparatuses 20 and 30 maybe implemented in hardware alone, partially in hardware and in software, or in software only, as further described at the end of this specification.

Figure 4:
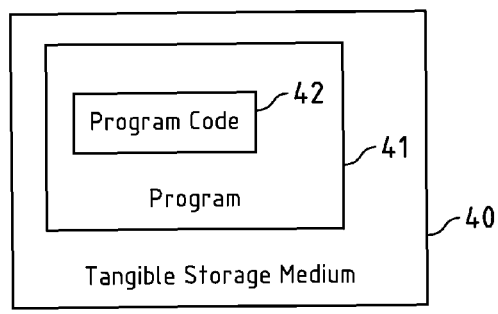
FIG. 4: a schematic presentation of an example of a tangible storage medium according to the first embodiment of the invention.

FIG. 4 is a schematic presentation of an example of a tangible storage medium 40 according to the first embodiment of the invention. This tangible storage medium 40, which may in particular be a non-transitory storage medium, comprises a program 41, which in turn comprises program code 42 (for instance a set of instructions). Realizations of tangible storage medium 40 may for instance be program memories 22 and 32 of FIGS. 2 and 3. Consequently, program code 42 may for instance implement the flowcharts of FIGS. 5-10 that will be discussed below.

Figure 5:
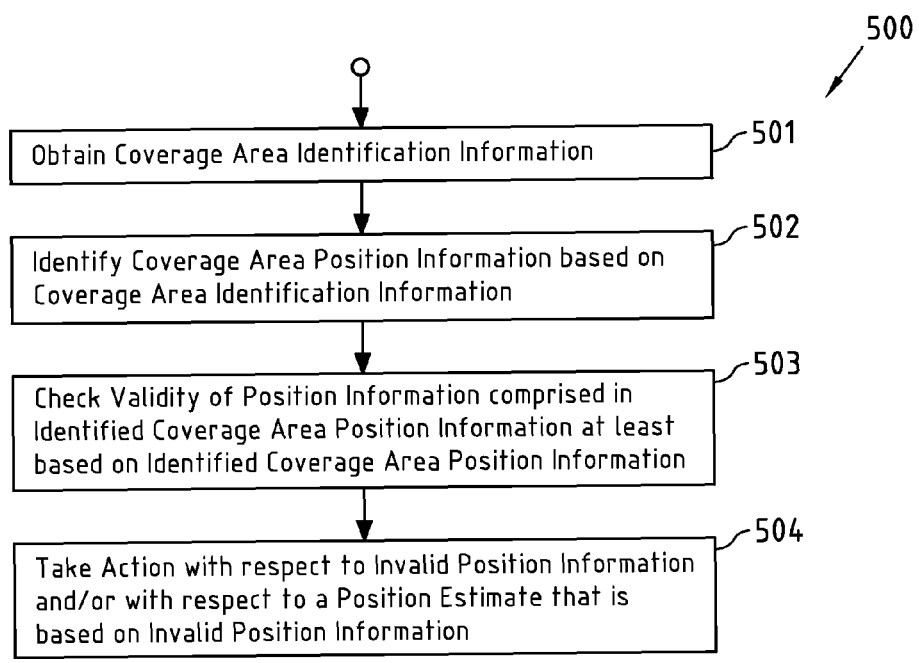
FIG. 5: a flowchart of an example of a method according to the first embodiment of the invention.

FIG. 5 is a flowchart 500 of an example of a method according to the first embodiment of the invention. This method may for instance be performed by device 2a of FIG. 1a, device 2b of FIG. 1b or server 4c of FIG. 1c.

In a step 501, coverage area identification information is obtained. The coverage area identification information identifies the one or more coverage areas that are currently associated with the device for which a position estimate is to be determined (e.g. device 2a, 2b or 2c of FIGS. 1a-1c). If flowchart 500 is performed by device 2a of FIG. 1a or device 2b of FIG. 1b, this coverage identification information is determined by device 2a or 2b and thus is locally obtainable within device 2a or 2b. If flowchart 500 is performed by server 4c of FIG. 1c, this coverage identification information is determined by device 2c and is then obtained by server 4c by reception from device 2c.

In a step 502, based on the radiomap database (stored in device 2a, device 2b or server 4c of FIGS. 1a-1c) coverage area PI is identified based on the coverage area identification information obtained in step 501. The coverage area PI comprises the PI (e.g. centre position and optionally extent) of the coverage area models of the coverage areas identified in the coverage area identification information and thus associated with the device to be positioned.

In a step 503, then validity of PI comprised in the coverage area PI identified in step 502 is checked at least based on the coverage area PI identified in step 502. Specific embodiments of this step will be explained with reference to the flowcharts of FIGS. 6-10 below.

In a step 504, then action is taken with respect to invalid PI (resulting from step 503) and/or with respect to a position estimate that is based on invalid PI (resulting from step 503). This may for instance comprise marking invalid PI in the radiomap database as invalid (for instance by setting an invalid flag for this PI, or by entering an identifier of this PI into a blacklist) or removing it from the radiomap database (for instance if flowchart 500 is performed by device 2a or server 4c), or causing invalid PI to be marked invalid or to be removed from the radiomap database (for instance if flowchart 500 is performed by device 2b, by sending invalidity information from device 2b to server 4b). With respect to a position estimate that is based on invalid PI, action may for instance be taken by discarding this position estimate, or by marking this position estimate unreliable.

According to a second embodiment of the invention, the first embodiment of the invention has the further feature(s) that the checking (see for instance step 503 of FIG. 5) is at least based on first PI for a first coverage area and second PI for a second coverage area, that the first PI and the second PI are stored or contained in the database, and that at least one of the first PI and the second PI is comprised in the identified coverage area PI. Therein, the first PI and the second PI may in particular have been stored or contained in the database already prior to the checking (for instance already before the coverage area identification information pertaining to the first PI and/or the second PI is determined by the device).

In this second embodiment of the invention, PI stored in the database may be compared against other PI stored in the database to check validity of PI, so that it may not be necessary to deploy positioning technologies such as for instance GNSS-based positioning techniques to check this validity.

In the second embodiment of the invention (and also in the third and fourth embodiment of the invention described below), the checking may at least be based on a difference between the first PI and the second PI. The checking may for instance comprise checking if a difference between the first PI and the second PI (e.g. a distance between centre positions of coverage areas respectively comprised in the first PI and the second PI) is larger than (or equal-to-or-larger-than) a threshold. If this is the case, the first PI and/or the second PI may be considered invalid. The threshold may for instance be a predefined threshold (which maybe an absolute or relative threshold), but may equally well be variable. For instance, the threshold may be adapted based on one or more parameters, such as a size of the coverage areas. The difference may for instance be calculated as a distance between the first and the second PI in meters. If available, uncertainty information associated with the first and second PI may be considered when determining the difference between the first and second PI.

According to a third embodiment of the invention, the second embodiment of the invention has the further feature(s) that both the first PI and the second PI are comprised in the identified coverage area PI.

The first coverage area and the second coverage area respectively associated with the first PI and the second PI may for instance be determined by the device as both being associated with the device because they are located in the same geographical area, so that their respective coverage providing entities can be heard by the device. It may then be checked if the difference (e.g. the distance between centre positions of coverage areas) between the corresponding first PI and the second PI is larger than (or equal-to-or-larger-than) a threshold, and if this is the case, at least one of both PI is considered invalid.

In the third embodiment of the invention, the two coverage areas may for instance be neighboured. Therein, a second coverage area may for instance be considered to be neighboured with respect to a first coverage area if a device that is located in the first coverage area (and is able to hear a coverage providing entity of the first coverage area) is able to hear a coverage providing entity of the second coverage area. Validity of respective PI for the first coverage area and the second coverage area may then for instance be checked by comparing the differences between the first PI and the second PI, which, in case of valid information, should be small since both coverage areas are neighboured.

The first and second PI may for instance be PI for a coverage area of a current cell and PI for a neighbour cell of a cellular radio communication system. The device may then for instance communicate with a base station of the serving cell, but may also be aware of base stations of one or more neighbour cells, for instance to allow handover and or base station diversity. If the PI for the neighbour cell is far away from the PI for the current cell (both of which are stored in the radiomap database), this serves as an indication that either the PI for the current cell or for the neighbour cell may be invalid.

Figure 6:
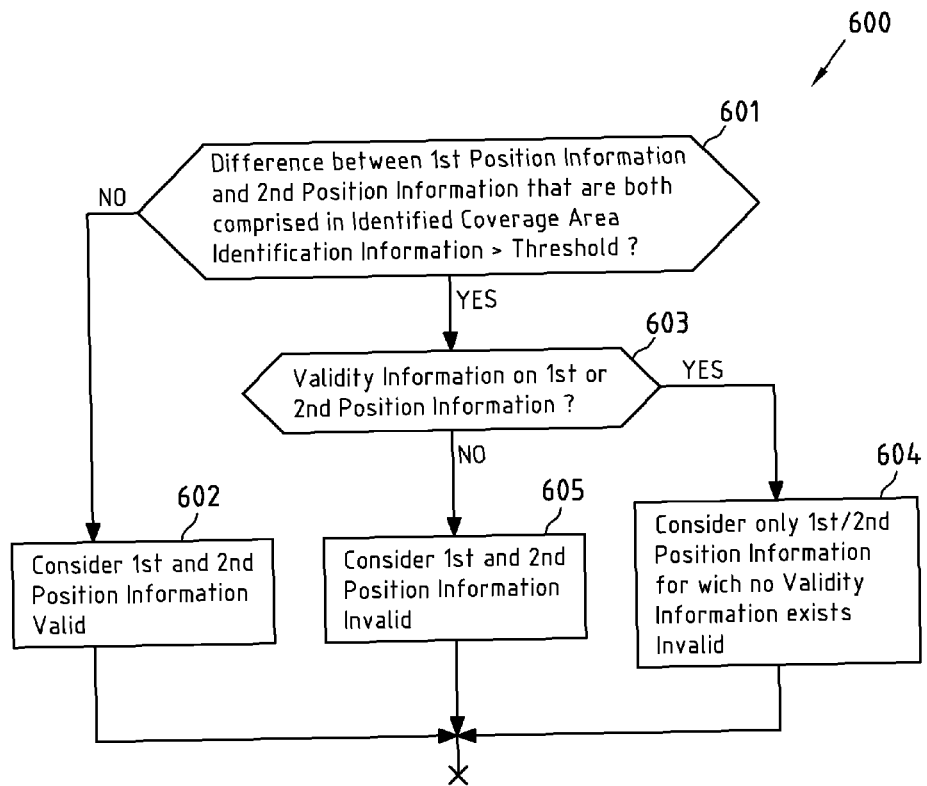
FIG. 6: a flowchart of an example for checking a validity of PI according to a third embodiment of the invention.

FIG. 6 is a flowchart 600 of an example for checking a validity of PI (see step 503 of FIG. 5) according to the third embodiment of the invention.

In a step 601, it is checked if a difference between first PI and second PI, both of which are comprised in the identified coverage area identification information yield from step 502 of FIG. 5 are larger than a threshold. If this is not the case, both are considered valid (step 602). Otherwise, it is checked in a step 603 if there is validity information indicating that the first or the second PI is valid. Such validity information may for instance stem from a previous checking step (that may be based on coverage area PI identified on previously determined coverage area identification information), or may be determined otherwise. If such validity information does not exist, both the first and second PI are considered invalid (step 605). Otherwise, only the PI for which no validity information exists is considered invalid (step 604).

If there is respective PI for more than two coverage areas in the identified coverage area PI, the flowchart 500 may for instance be performed for all possible pairings.

According to a fourth embodiment of the invention, the second embodiment of the invention has the further feature(s) that the first PI is comprised in the identified coverage area PI (that is identified based on currently determined coverage area identification information), and that the second PI is comprised in identified coverage area PI obtained from an identifying of coverage area PI stored in the database based on coverage area identification information previously determined by the device. Therein, the first PI and the second PI may for instance not relate to the same coverage area. In particular, the first PI may be for a coverage area for which there is no PI in the identified coverage area PI that is identified based on the previously determined coverage area identification information, and the second PI may be for a coverage area for which there is no PI in the identified coverage area PI (that is identified based on the currently determined coverage area identification information).

The checking is thus based on first PI comprised in identified coverage area PI identified based on current coverage area identification information and second PI comprised in identified coverage area PI identified based on previous coverage area identification information. The previous coverage area identification information may for instance be determined by the device immediately before the current coverage area identification information. Alternatively, one or more further coverage area identification information determination steps (and possibly respective identifying steps) may have taken place between the determining of the previous coverage area identification information and the determining of the current coverage area identification information. Basing the checking of validity of PI on first PI and second PI that are identified based on subsequently determined coverage area identification information may for instance allow detecting invalid PI when an association of the device with coverage areas changes. For instance, if previous coverage area identification information leads to the first PI for a first coverage area with which the device is associated at that time, and if a current coverage area identification information leads to the second PI for a second coverage area with which the device is currently associated, large differences between the first PI and the second PI (e.g. large distances between centre positions of coverage areas) may indicate that at least one of both is invalid, for instance depending on the temporal difference between the determining of the previous coverage area identification information and the current coverage area identification information and the speed (e.g. the current speed or the maximum possible speed) of the device. This maybe checked by comparing the difference against a threshold. This may for instance be a pre-defined absolute threshold that is calculated based on a known temporal difference between subsequent determining steps for coverage area identification information and a pre-defined velocity, or maybe a pre-defined relative threshold in which the velocity component is fixed and the temporal difference is considered as a variable factor. In both cases, the threshold may nevertheless be dynamically adaptable based on at least one further parameter. If the difference between the first PI and the second PI exceeds (or is at least equal to) the threshold, it may be decided that only the first PI is invalid. This may for instance be based on previous findings (from previous validity checks) that the second PI is valid.

Figure 7:
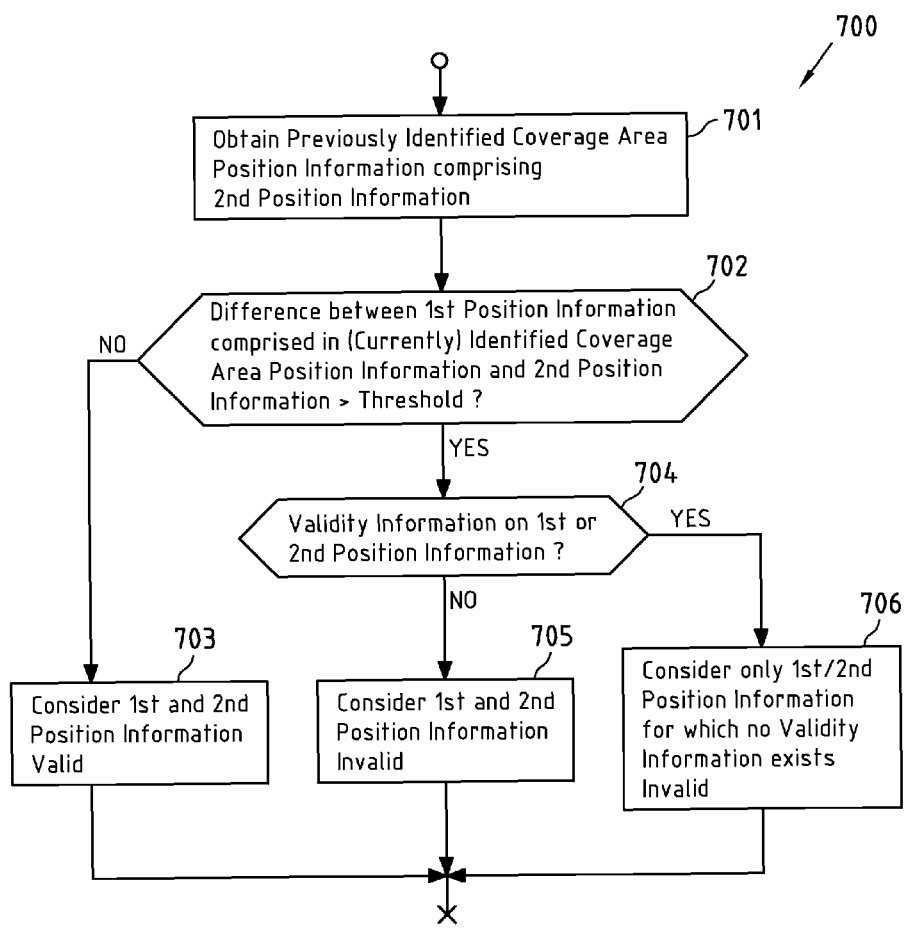
FIG. 7: a flowchart of an example for checking a validity of PI according to a fourth embodiment of the invention.

FIG. 7 is a flowchart 700 of an example for checking a validity of PI (see step 503 of FIG. 5) according to the fourth embodiment of the invention.

In a step 701, previously identified coverage area identification information (comprising second PI) is obtained. Such information may for instance have been stored in a previous execution of flowchart 500 of FIG. 5.

In a step 702, it is then checked if a difference between first PI comprised in currently identified coverage area PI (i.e. the identified coverage area PI yield from step 502 of FIG. 5) and the second PI obtained in step 701 is larger than a threshold. If the difference is not larger than the threshold, both the first and second PI are considered valid. Otherwise, it is checked in step 703 if there exists validity information for the first or the second PI. It may for instance be the case that the second PI has been considered valid in the previous execution of flowchart 500 of FIG. 5, and that this result has been stored and can be recovered for the checking of step 703. If there is no validity information for the first and second PI, both are considered invalid (step 705). Otherwise, only the PI for which no validity information exists is considered invalid (step 706).

The first and second PI may for instance be PI for two respective coverage areas (for instance respectively pertaining to cells of a cellular radio communication system) between which the device moves between the determining of the previous coverage area identification information and the determining of the current coverage area identification information. Thus when the device moves from one coverage area to another, it can be detected whether the respective PI for these coverage areas in the radiomap database indicates that they are close to each other or far away from each other. In the latter case, PI in the radiomap database for the new coverage area can then for instance be considered invalid, for instance based on the assumption that the PI for the previous coverage area has already been validated when it was compared with its predecessor, or PI for both coverage areas may be considered invalid.

According to a fifth embodiment of the invention, the second embodiment of the invention has the further feature(s) that the checking is at least based on a difference between a (current) position estimate for the device determined at least based on at least a part of the identified coverage area PI and a previous position estimate for the device determined at least based on at least a part of identified coverage area PI obtained from an identifying of coverage area PI stored in the database based on coverage area identification information previously determined by the device, that the identified coverage area PI comprises the first PI, and that the identified coverage area PI obtained from the previous identifying comprises the second PI.

In this embodiment, thus a difference between a current position estimate and a previous position estimate (e.g. an immediately preceding position estimate or a position estimate that is further in the past than an immediately preceding position estimate) is used as a basis for the validity check of PI. For instance, if this difference (e.g. a distance between both position estimates) is larger than (or larger-than-or-equal-to) a threshold, it may be considered that at least one of the identified coverage area PI on which the current position estimate is based and the identified coverage area PI on which the previous position estimate is based is at least partially invalid, because the position of the device cannot change by such an amount such fast. For instance, then all PI contained in the identified coverage area PI on which the current position estimate is based may be considered to be invalid. The threshold may for instance be a pre-defined absolute threshold that is calculated based on a known temporal difference between subsequent determining steps (e.g. a current and a previous determining step) for coverage area identification information and a pre-defined velocity, or may be a pre-defined relative threshold in which the velocity component is fixed and the temporal difference is considered as a variable factor. In both cases, the threshold may nevertheless be dynamically adaptable based on at least one further parameter. If the difference between the current position estimate and the previous position estimate exceeds (or is at least equal to) the threshold, it may be decided that only the current coverage area PI (comprising the first PI) is invalid. This may for instance be based on previous findings (e.g. from previous validity checks) that the previous position estimate and/or the identified coverage area position on which it is based is valid.

Figure 8:
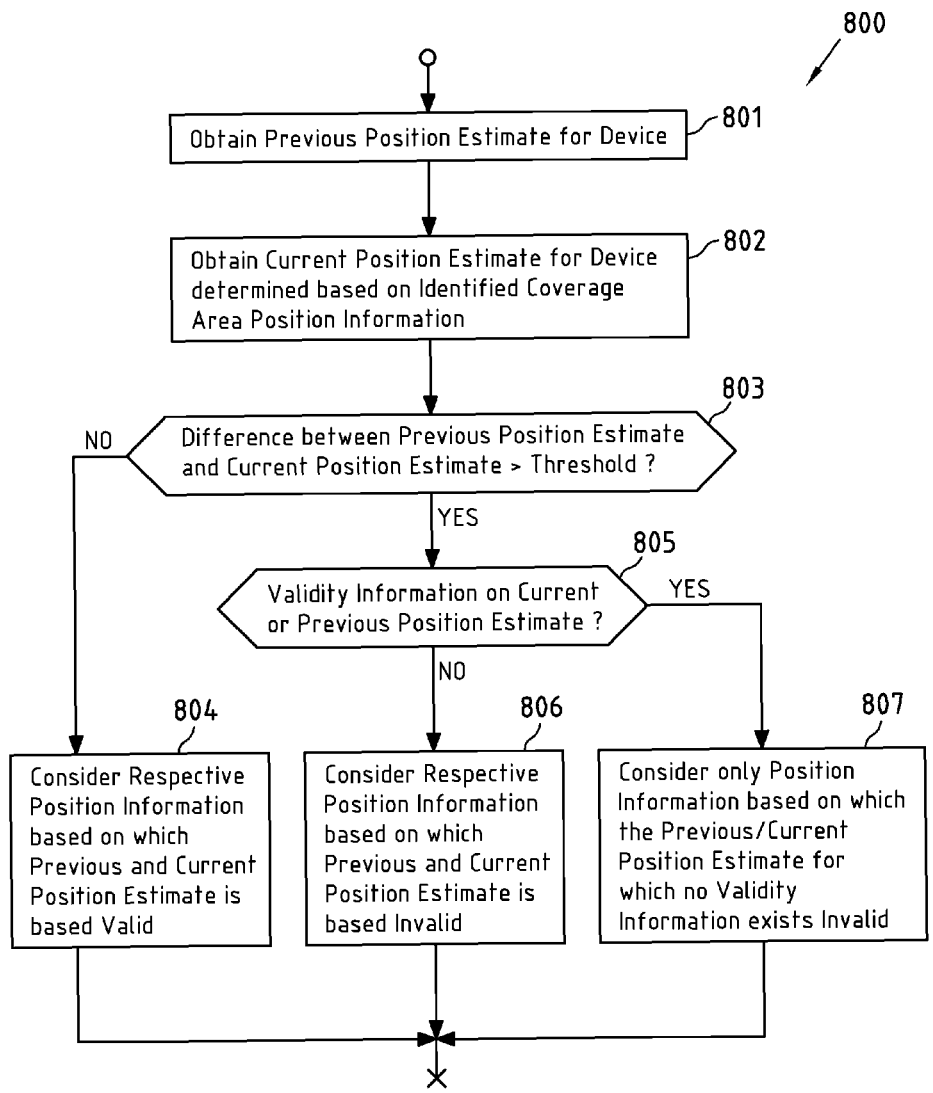
FIG. 8: a flowchart of an example for checking a validity of PI according to a fifth embodiment of the invention.

FIG. 8 is a flowchart 800 of an example for checking a validity of PI (see step 503 of FIG. 5) according to the fifth embodiment of the invention.

In a step 801, a previous position estimate for the device is obtained (for instance from a memory where it has been stored). In a step 802, then a current position estimate for the device determined based on identified coverage area PI (yield from step 502 of FIG. 5) is obtained (for instance by obtaining it from another unit, or by an active step of determining it). If the difference between the previous position estimate and the current estimate is equal to or smaller than a threshold (step 803), it is considered that the respective PI based on which the previous position estimate and the current position estimate is based is valid (step 804). Otherwise, it is checked in step 805 if there is validity information for the current or the previous position estimate (for instance from a previous execution of flowchart 500). If this is the case, only the PI on which the position estimate for which no validity information exists is based is considered invalid (step 807). Otherwise, the respective PI based on which the previous position estimate and the current position estimate are based is considered invalid (step 806).

Thus, in the present example, if a position estimate "jumps" between a previous and a current position estimate by a large amount/distance, this is considered an indication that either the radiomap data related to the current position estimate or the previous position estimate has one or more errors.

According to a sixth embodiment of the invention, the first embodiment of the invention has the further feature(s) that the checking is at least based on a difference between at least one of PI for a coverage area of the one or more coverage areas comprised in the identified coverage area PI and a position estimate for the device determined at least based on the PI for the coverage area of the one or more coverage areas comprised in the identified coverage area PI and a position estimate for the device determined based on signals from one or more satellites of a satellite-based positioning system received at the device.

In this embodiment, a position estimate for the device determined based on a satellite-based positioning system (e.g. a GNSS system, such as for instance a Global Positioning System (GPS), or a Galileo or GLONASS system, to name but a few examples) is thus used as a reference to check a validity of PI stored in the database. This position may be compared against a position estimate for the device determined based on the identified coverage area PI, or against one or more (e.g. all) respective PI for a coverage area comprised in the identified coverage area PI. If the difference is larger than (or equal-to-or-larger-than) a threshold, the PI comprised in the identified coverage area PI is at least partially considered to be invalid (under the assumption that the satellite-based position estimate is correct). Therein, if the satellite-based position estimate is compared against the position estimate based on the identified coverage area PI and if the difference is larger than (or equal-to-or-larger-than) a threshold, all PI comprised in the identified coverage area PI may be considered invalid. In contrast, if the satellite-based position estimate is compared against respective PI for one or more coverage areas comprised in the identified coverage area PI and if the difference is larger than (or equal-to-or-larger-than) a threshold, only respective PI for some of the one or more coverage areas may be considered invalid depending on their difference with respect to the satellite-based position estimate (for instance, only PI that does not contain the satellite-based position estimate or has a distance to the satellite-based position estimate that exceeds a threshold may be considered invalid).

Figure 9:
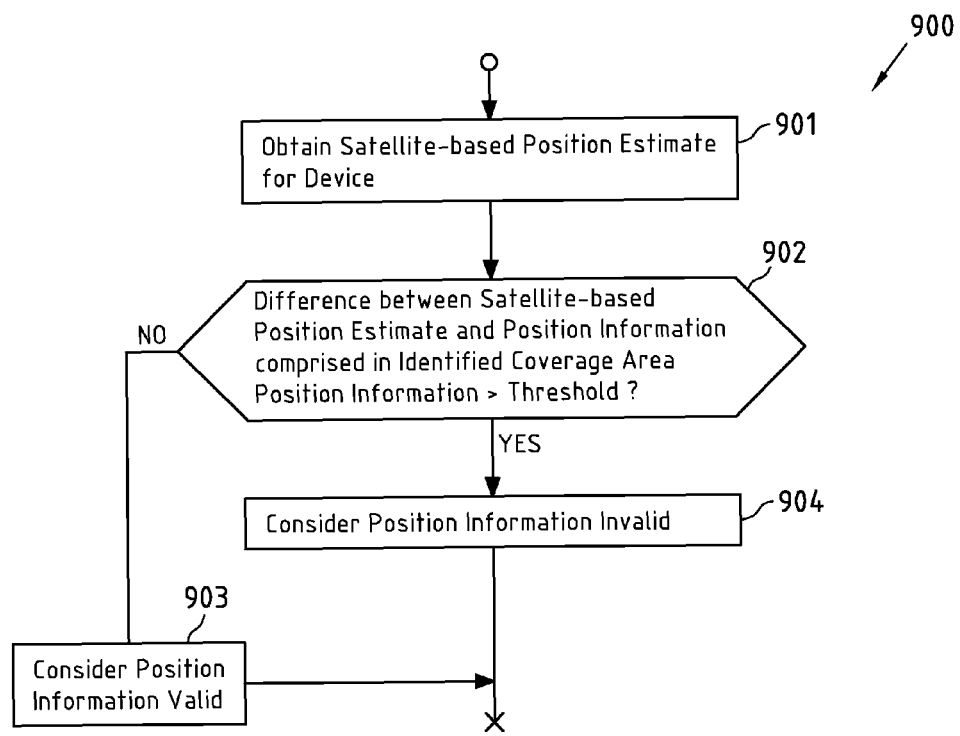
FIG. 9: a flowchart of an example for checking a validity of PI according to a sixth embodiment of the invention.

FIG. 9 is a flowchart 900 of an example for checking a validity of PI (see step 503 of FIG. 5) according to the sixth embodiment of the invention.

In a step 901, a satellite-based position estimate for the device is obtained (for instance from another unit). In a step 902, a difference between the satellite-based position estimate and PI comprised in identified coverage area PI (yield from step 502 of FIG. 5) is determined and compared against a threshold (step 902). If the difference is smaller than or equal to the threshold, the PI is considered valid (step 903). Otherwise, the PI is considered invalid.

Therein, if the identified coverage area PI comprises respective PI for more than one coverage area, the steps 902-904 of flowchart 900 may for instance be performed for the PI of each coverage area, respectively.

Furthermore, as indicated above, instead of comparing the satellite-based position estimate against the PI comprised in the identified coverage area PI, this satellite-based position estimate could also be compared against a position estimate determined based on the identified coverage area PI, and depending on the outcome of this comparison, the PI on which the position estimate is based can be considered valid or invalid.

Thus, according to the sixth embodiment, devices that have both radiomap-based and GNSS-based positioning capabilities can for instance use the GNSS coordinates and check if they match the position estimate that can be found for the current attached serving cell from the radiomap database.

According to a seventh embodiment of the invention, the first embodiment of the invention has the further feature(s) that the one or more coverage areas are associated with a first communication system, and that the checking is at least based on a difference between
    at least one of PI for a coverage area of the one or more coverage areas comprised in the identified coverage area PI and a position estimate for the device determined at least based on the PI for the coverage area of the one or more coverage areas comprised in the identified coverage area PI and
    at least one of
        PI for a coverage area of one or more coverage areas associated with a second communication system, the PI for the coverage area comprised in identified coverage area PI that comprises respective PI for the one or more coverage areas associated with the second communication system and with the device and that is identified at least based on coverage area identification information for the one or more coverage areas associated with the second communication system determined by the device, wherein the second communication system is at least one of different from and operated by another operator than the first communication system, and
        a position estimate for the device determined at least based on the PI for the coverage area of the one or more coverage areas associated with the second communication system.

In this embodiment, thus information pertaining to a first communication system is compared with information pertaining to a second communication system to check validity of coverage area information. For instance, a position estimate for the device determined based on information pertaining to the first communication system may be compared against a position estimate for the device determined based on information pertaining to the first communication system. Equally well, PI comprised in identified coverage area PI pertaining to the first communication system may be compared against PI comprised in identified coverage area PI pertaining to the second communication system. It is also possible that a position estimate for the device determined based on information pertaining to the first communication system is compared against PI comprised in identified coverage area PI pertaining to the second communication system.

The PI for the coverage area of the one or more coverage areas associated with the second communication system may be stored in the same database as the PI for the coverage area of the one or more coverage areas associated with the first communication system, or in a separate database.

The respective coverage area PI with respect to both communication systems is identified based on respective coverage area identification information determined by the device with respect to both communication systems.

For instance, the device may be capable of establishing (and maintaining) a connection in the first communication system (e.g. a 2G or 3G communication system) and to (concurrently or in alternating intervals) scan for coverage providing entities of the second communication system (e.g. a 2G or 3G communication system of the same or a different operator, or a WLAN system) to be able to decide if it can hear one or more coverage providing entities of the second communication system, or vice versa. The device may then for instance be a single-SIM (Subscriber Identity Module) device. The scanning for coverage providing entities may for instance be a part of a roaming functionality implemented by the device. For instance, when a device is roaming (or has roamed) to another operator's network, it may continuously scan for its home network. Similarly, when a device is connected to a 2G network, it may scan for a 3G network.

For instance, if the device (for instance by means of a modem or another component) is capable of scanning for one or more other systems and of getting an identification of the other system(s), then this information may be used to lookup information in the radiomap (e.g. an SQL radiomap) and see if a position estimate (for instance with accompanying uncertainty information) based on one or more coverage areas (e.g. cells) of the other system(s) currently associated with the device match a position estimate that is based on the coverage area(s) of the currently active system. If they do not match, then one of the systems may have changed and the related coverage areas should not be used for position calculation any longer.

Additionally or alternatively, the device may be capable of scanning for one or more coverage providing entities of the first communication system and the second communication system, respectively, for instance to be able to decide if it can hear one or more coverage providing entities of the first communication system and the second communication system, respectively. Scanning for coverage providing entities of the first communication system and the second communication system may for instance take place at the same time, or at least in alternating time intervals.

The device may for instance be a dual-SIM device, for instance in case that both communication systems are cellular radio communication systems (for instance 2G or 3G communication systems of the same operator or of different operators). The device may for instance have established connections in both the first communication system and the second communication system at the same time. Equally well, the first communication system may be a cellular radio communication system, and the second communication system may be a WLAN, or vice versa, to name but a few non-limiting examples.

Figure 10:
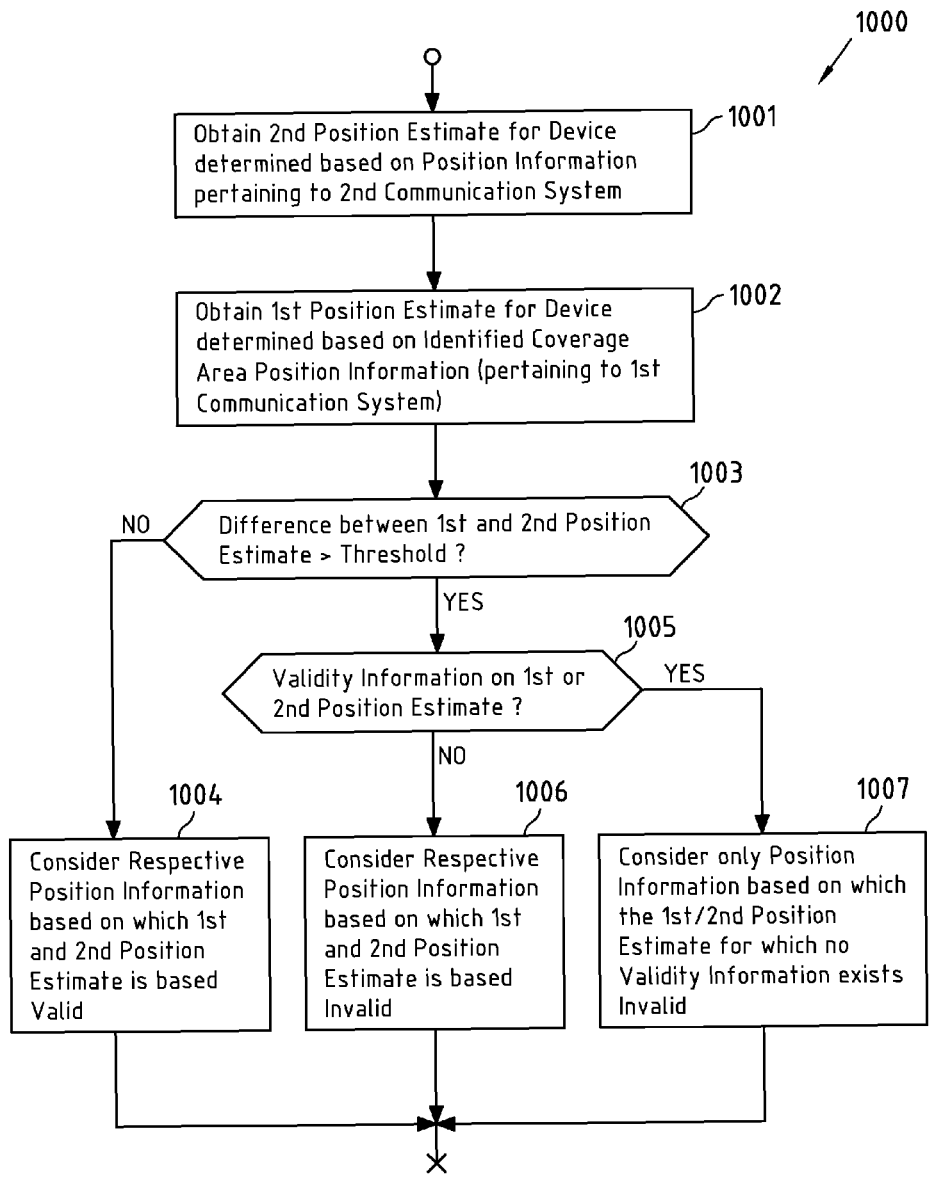
FIG. 10: a flowchart of an example for checking a validity of PI according to an seventh embodiment of the invention.

FIG. 10 is a flowchart 1000 of an example for checking a validity of PI (see step 503 of FIG. 5) according to the seventh embodiment of the invention.

In a step 1001, a second position estimate for the device determined based on PI pertaining to the second communication system is obtained (for instance by obtaining it from another unit, or by an active step of determining it). This second position estimate may for instance be determined based on identified coverage area PI identified based on coverage area identification information determined by the device and pertaining to coverage areas of the second communication system. This second position estimate may for instance be determined by the devices 2a or 2b of FIGS. 1a and 1b or by server 4c of FIG. 1c.

In a step 1002, a first position estimate for the device determined based on identified coverage area PI (for instance yield from step 502 of FIG. 5) pertaining to the first communication system is obtained (for instance by obtaining it from another unit, or by an active step of determining it). This first position estimate may for instance be determined by the devices 2a or 2b of FIGS. 1a and 1b or by server 4c of FIG. 1c.

In step 1003, it is checked if a difference between the first and second position estimate is larger than a threshold. If this is not the case, it is considered that the respective PI based on which the first position estimate and the second position estimate is based is valid (step 1004). Otherwise, it is checked in step 1005 if there is validity information for the first or the second position estimate (for instance from a previous execution of flowchart 500). If this is the case, only the PI on which the position estimate for which no validity information exists are based is considered invalid (step 1007). Otherwise, the respective PI based on which the first position estimate and the second position estimate are based is considered invalid (step 1006).

As described above, instead of comparing the first and second position estimates that pertain to different communication systems, also the PI for the different communication systems could be compared, or a position estimate pertaining to a communication system could be compared to PI pertaining to another communication system.

The flowchart of FIG. 10 thus for instance covers the example case that the device can access and get finger print information from another network provided by the same operator (e.g. a 2G network while acting on a 3G network). Such redundant position estimate information can be compared with a position estimate based on the connected network. If these estimates differ too much, the position information and/or the position estimate maybe considered to be invalid.

The flowchart of FIG. 10 also covers the example case that the device can access and get finger print information from a network offered by another operator in same area. A position provided from this fingerprint data may then be used in a comparison with the position information from the connected network. In case this data differs too much, the position estimate and/or the position information may be considered to be invalid.

The flowchart of FIG. 10 also covers the example case that in devices with multiple SIM and/or multiple modem capability (e.g. in dual SIM and/or dual modem devices), a network connection available via one of the SIM cards in the device is used when calculating a redundant position estimate, and this redundant position estimate is then compared against a position estimate obtained based on a network connection available via the other SIM card. Again, if the two position calculations differ too much, the position calculation (or the PI it is based on) can be considered invalid.

Methods according to any of the first to seventh embodiment of the invention may further comprise causing respective PI for one or more coverage areas for which the checking revealed that it is invalid to be marked invalid or to be removed from the database. PI may for instance be marked invalid by setting an invalid flag for this PI, or by modifying a confidence level of this PI, or by entering an identifier of this PI or the corresponding coverage area into a list (e.g. a blacklist).

Methods according to any of the first to seventh embodiment of the invention may further comprise determining the position estimate for the device at least based on at least a part of the identified coverage area PI.

Therein, respective PI for one or more coverage areas for which the checking revealed that it is invalid may then not form a basis for the determining of the position estimate for the device.

Equally well, a position estimate determined based on respective PI for one or more coverage areas for which the checking revealed that it is invalid may then be discarded or marked unreliable.

As used in this application, the term 'circuitry' refers to all of the following:
(a) hardware-only circuit implementations (such as implementations in only analog and/or digital circuitry) and
(b) combinations of circuits and software (and/or firmware), such as (as applicable):
(i) to a combination of processor(s) or
(ii) to portions of processor(s)/software (including digital signal processor(s)), software, and memory(ies) that work together to cause an apparatus, such as a mobile phone or a positioning device, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a positioning device.

With respect to the embodiments of the invention described above, it is understood that a disclosure of any action or step of a method according to this embodiment shall be understood as a disclosure of a corresponding (functional) configuration of an apparatus (for instance a configuration of the computer program code and/or the processor and/or some other means of the apparatus) according to this embodiment, of a corresponding computer program code defined to cause such an action or step when executed and/or of a corresponding (functional) configuration of a system (or parts thereof) according to this embodiment.

The embodiments of the invention presented above and their single features shall also be understood to be disclosed in all possible combinations with each other. In particular, it is understood that two or more (e.g. all) of the different checking approaches according to the second to seventh embodiment of the present invention may be applied together to check validity of PI stored in the database. It should also be understood that the sequence of method steps in the flowcharts presented above is not mandatory, also alternative sequences may be possible.

The invention has been described above by means of embodiments, which shall be understood to be non-limiting examples. In particular, it should be noted that there are alternative ways and variations which are obvious to a skilled person in the art and can be implemented without deviating from the scope and spirit of the appended claims.

The invention claimed is:

1. A method performed by an apparatus, said method comprising:
    identifying coverage area position information to obtain identified coverage area position information that comprises at least respective position information for one or more coverage areas associated with a device for which a position estimate is to be determined,
        wherein said position estimate is to be determined at least based on at least a part of said identified coverage area position information,
        wherein said respective position information for said one or more coverage areas is stored in a database, and
        wherein said identifying coverage area position information is at least based on coverage area identification information determined by said device, which comprises at least respective identification information for said one or more coverage areas; and
    checking a validity of respective position information for at least one coverage area associated with the device,
        wherein said respective position information for said at least one coverage area is stored in said database,
        wherein said checking is at least based on respective position information for at least one of said one or more coverage areas associated with the device other than said at least one coverage area for which the validity of the respective position information for the at least one coverage area is being checked; and
        wherein said checking is further at least based on first position information for a first coverage area and second position information for a second coverage area, said first position information and said second position information stored in said database, and wherein at least one of said first position information and said second position information is comprised in said identified coverage area position information.

2. The method according to claim 1, wherein one of the following holds:
    both said first position information and said second position information are comprised in said identified coverage area position information, and said first position information is comprised in said identified coverage area position information and said second position information is comprised in identified coverage area position information obtained from an identifying of coverage area position information stored in said database based on coverage area identification information previously determined by said device.

3. The method according to claim 1, wherein said checking is at least based on at least one of
    a difference between said first position information and said second position information, and
    a difference between a position estimate for said device determined at least based on at least a part of said identified coverage area position information and a previous position estimate for said device determined at least based on at least a part of identified coverage area position information obtained from an identifying of coverage area position information stored in said database based on coverage area identification information previously determined by said device, wherein said identified coverage area position information comprises said first position information, and wherein said identified coverage area position information obtained from said previous identifying comprises said second position information.

4. The method according to claim 1, wherein said checking is at least based on a difference between
    at least one of position information for a coverage area of said one or more coverage areas comprised in said identified coverage area position information and a position estimate for said device determined at least based on said position information for said coverage area of said one or more coverage areas comprised in said identified coverage area position information and
    a position estimate for said device determined based on signals from one or more satellites of a satellite-based positioning system received at said device.

5. The method according to claim 1, wherein said one or more coverage areas are associated with a first communication system, and wherein said checking is at least based on a difference between
    at least one of position information for a coverage area of said one or more coverage areas comprised in said identified coverage area position information and a position estimate for said device determined at least based on said position information for said coverage area of said one or more coverage areas comprised in said identified coverage area position information and
    at least one of
        position information for a coverage area of one or more coverage areas associated with a second communication system, said position information for said coverage area comprised in identified coverage area position information that comprises respective position information for said one or more coverage areas associated with said second communication system and with said device and that is identified at least based on coverage area identification information for said one or more coverage areas associated with said second communication system determined by said device, wherein said second communication system is at least one of different from and operated by another operator than said first communication system, and
        a position estimate for said device determined at least based on said position information for said coverage area of said one or more coverage areas associated with said second communication system.

6. The method according to claim 1, further comprising at least one of:
    causing respective position information for one or more coverage areas for which said checking revealed that it is invalid to be marked invalid or to be removed from said database, and
    determining said position estimate for said device at least based on at least a part of said identified coverage area position information.

7. The method according to claim 6, wherein said position estimate for said device is determined at least based on at least a part of said identified coverage area position information, and wherein one of the following holds:
    respective position information for one or more coverage areas for which said checking revealed that it is invalid do not form a basis for said determining of said position estimate for said device, and a position estimate determined based on respective position information for one or more coverage areas for which said checking revealed that it is invalid are one of discarded and marked unreliable.

8. The method according to claim 1, wherein said apparatus is one of
a part of said device, and
a part of a server that is configured to receive said coverage area identification information from said device.

9. A non-transitory computer-readable medium having a computer program stored thereon, the computer program comprising program code for performing the method according to claim 1 when said computer program is executed on a processor.

10. An apparatus, comprising at least one processor; and at least one memory including computer program code, said at least one memory and said computer program code configured to, with said at least one processor, cause said apparatus at least to
identify coverage area position information to obtain identified coverage area position information that comprises at least respective position information for one or more coverage areas associated with a device for which a position estimate is to be determined,
wherein said position information is to be determined at least based on at least a part of said identified coverage area position information,
wherein said respective position information for said one or more coverage areas is stored in a database, and
wherein said identifying coverage area position information to obtain said identified coverage area position information is at least based on coverage area identification information determined by said device, which comprises at least respective identification information for said one or more coverage areas; and
check a validity of respective position information for at least one coverage area associated with the device,
wherein said respective position information for said at least one coverage area is stored in said database,
wherein said validity is checked at least based on respective position information for at least one of said one or more coverage areas associated with the device other than said at least one coverage area for which the validity of the respective position information for the at least one coverage area is being checked; and
wherein said validity of said respective position information for said at least one coverage area is checked further at least further on first position information for a first coverage area and second position information for a second coverage area, said first position information and said second position information stored in said database, and wherein at least one of said first position information and said second position information is comprised in said identified coverage area position information.

11. The apparatus according to claim 10, wherein one of the following holds:
both said first position information and said second position information are comprised in said identified coverage area position information, and
said first position information is comprised in said identified coverage area position information and said second position information is comprised in identified coverage area position information obtained from an identifying of coverage area position information stored in said database based on coverage area identification information previously determined by said device.

12. The apparatus according to claim 10, wherein said validity of said respective position information for said at least one coverage area is checked at least based on at least one of
a difference between said first position information and said second position information, and
a difference between a position estimate for said device determined at least based on at least a part of said identified coverage area position information and a previous position estimate for said device determined at least based on at least a part of identified coverage area position information obtained from an identifying of coverage area position information stored in said database based on coverage area identification information previously determined by said device, wherein said identified coverage area position information comprises said first position information, and wherein said identified coverage area position information obtained from said previous identifying comprises said second position information.

13. The apparatus according to claim 10, wherein said validity of said respective position information for said at least one coverage area is checked at least based on a difference between
at least one of position information for a coverage area of said one or more coverage areas comprised in said identified coverage area position information and a position estimate for said device determined at least based on said position information for said coverage area of said one or more coverage areas comprised in said identified coverage area position information and a position estimate for said device determined based on signals from one or more satellites of a satellite-based positioning system received at said device.

14. The apparatus according to claim 10, wherein said one or more coverage areas are associated with a first communication system, and wherein said validity of said respective position information for said at least one coverage area is checked at least based on a difference between
at least one of position information for a coverage area of said one or more coverage areas comprised in said identified coverage area position information and a position estimate for said device determined at least based on said position information for said coverage area of said one or more coverage areas comprised in said identified coverage area position information and
at least one of
position information for a coverage area of one or more coverage areas associated with a second communication system, said position information for said coverage area comprised in identified coverage area position information that comprises respective position information for said one or more coverage areas associated with said second communication system and with said device and that is identified at least based on coverage area identification information for said one or more coverage areas associated with said second communication system determined by said device, wherein said second communication system is at least one of different from and operated by another operator than said first communication system, and
a position estimate for said device determined at least based on said position information for said coverage area of said one or more coverage areas associated with said second communication system.

15. The apparatus according to claim 10, further configured to at least one of cause respective position information for one or more coverage areas for which said checking revealed that it is invalid to be marked invalid or to be removed from said database, and determine said position estimate for said device at least based on at least a part of said identified coverage area position information.

16. The apparatus according to claim 15, wherein said position estimate for said device is determined at least based on at least a part of said identified coverage area position information, and wherein one of the following holds:

respective position information for one or more coverage areas for which said checking revealed that it is invalid do not form a basis for said determining of said position estimate for said device, and a position estimate determined based on respective position information for one or more coverage areas for which said checking revealed that it is invalid is one of discarded and marked unreliable.

17. The apparatus according to claim 10, wherein said apparatus is one of:

a part of said device, and a part of a server that is configured to receive said coverage area identification information from said device.

18. The apparatus according to claim 10, further comprising a user interface.

* * * * *